United States Patent [19]

Pitcher

[11] Patent Number: 4,776,447
[45] Date of Patent: Oct. 11, 1988

[54] METHOD AND APPARATUS FOR ORIENTATING CAN ENDS

[75] Inventor: Timothy J. Pitcher, Berkshire, United Kingdom

[73] Assignee: Metal Box Plc, Reading, England

[21] Appl. No.: 74,708

[22] Filed: Jul. 17, 1987

[30] Foreign Application Priority Data

Jul. 17, 1986 [GB] United Kingdom .............. 8617442

[51] Int. Cl.⁴ .............................................. B65G 47/24
[52] U.S. Cl. .................................... 198/394; 198/411; 198/416; 198/379
[58] Field of Search .............. 198/378, 385, 379, 395, 198/394, 398, 410, 411, 416, 688.1, 690.1, 388, 803.14, 803.15; 414/757, 780, 781, 782, 784

[56] References Cited

U.S. PATENT DOCUMENTS

| 3,163,281 | 12/1964 | Rieck | 198/394 X |
| 3,541,751 | 11/1970 | Quebe et al. | 198/395 X |
| 3,628,650 | 12/1971 | Rouse | 198/394 |
| 3,993,199 | 11/1976 | Jorgensen et al. | 198/379 X |
| 4,721,199 | 1/1988 | Ioannides | 198/394 X |

FOREIGN PATENT DOCUMENTS

1542678 3/1979 United Kingdom .
1574226 9/1980 United Kingdom .

Primary Examiner—Robert J. Spar
Assistant Examiner—Lyle Kimms
Attorney, Agent, or Firm—Burns, Doane, Swecker & Mathis

[57] ABSTRACT

Can ends having an off-center aperture, are each orientated by a resiliently mounted peg which engages a surface of the can end and is rotated about a pitch circle for one complete revolution. The peg seeks and enters the aperture and thereafter causes the can end to rotate with it until it stops at a position corresponding to the desired orientation of the can end. The peg is then withdrawn from the aperture and the can end, supported in a carrier plate and is delivered to a moulding machine (not shown) in which a plastics closure is moulded into the aperture.

9 Claims, 3 Drawing Sheets

4,776,447

METHOD AND APPARATUS FOR ORIENTATING CAN ENDS

FIELD OF THE INVENTION

The present invention relates to a method and apparatus for orientating about their central axes, circular can ends of the kind which have an off-centre aperture therein. Such can ends may, for example, have a single aperture in the shape of a "race-track" or may have one or more circular apertures at least one of which is located off-centre.

Can ends of this type are stamped out from a blank and are to be fitted, such as by snap fitting or moulding, with a plastics closure in the aperture. In order for the closure to be reliably fitted in the aperture it is essential that the can ends are delivered to the fitting or moulding machine in a specified orientation.

DESCRIPTION OF THE PRIOR ART

A known method and apparatus for orientating can ends are described in British patent No. 1574226 (Styner and Bienz). In this method, can ends which do not have apertures, are provided with a raised portion and are rotated in two stages until the raised portion is brought into engagement with a stop. The prior method thus requires the formation, during stamping out of the can end, of the raised portion which in the case of can ends of the kind described above would not serve any purpose after orientation. It is an object of the present invention to provide a method and apparatus for orientating apertured can ends by means of the apertures. In GB No. 1574226 the unpierced can ends are themselves rotated until the raised portion abuts the stop. A second locating station is provided at which the accuracy of the orientation is refined. The apparatus precludes the possibility of the can ends being transported on a simple carrier as is permitted by the present invention.

SUMMARY OF THE INVENTION

According to a first aspect of the present invention there is provided apparatus for orientating about their central axes, circular can ends of the kind having an off-centre aperture therein comprising:

(a) means to deliver each can end to an orienting station;
(b) resiliently mounted orientating means supported at the orientation station for rotation about a pitch circle intersecting the aperture;
(c) means for effecting relative motion between the orientating means and a can end at the orientating station to bring the orientating means into engagement with the can end; and
(d) means for rotating the orientating means about the pitch circle to cause the orientating means to seek and enter the aperture such that continued rotation of the orientating means brings the can end to a desired orientation at which rotation is stopped.

According to a second aspect of the present invention there is provided a method of orientating about their central axes, can ends of the kind having an off-centre aperture therein, the method comprising the steps of:

(a) delivering the can ends to an orientating station;
(b) bringing a resiliently supported orientating member into engagement with a can end at the orientating station on a pitch circle which intersects the off-centre aperture;
(c) rotating the orientating means through at least one revolution around the pitch circle such that the orientating means seeks and enters the eccentric aperture and thereafter causes the can end to rotate with it; and
(d) stopping the rotation of the orientating means and the can end at a position corresponding to a desired orientation of the can end.

DETAILED DESCRIPTION OF THE INVENTION

Figure 1:
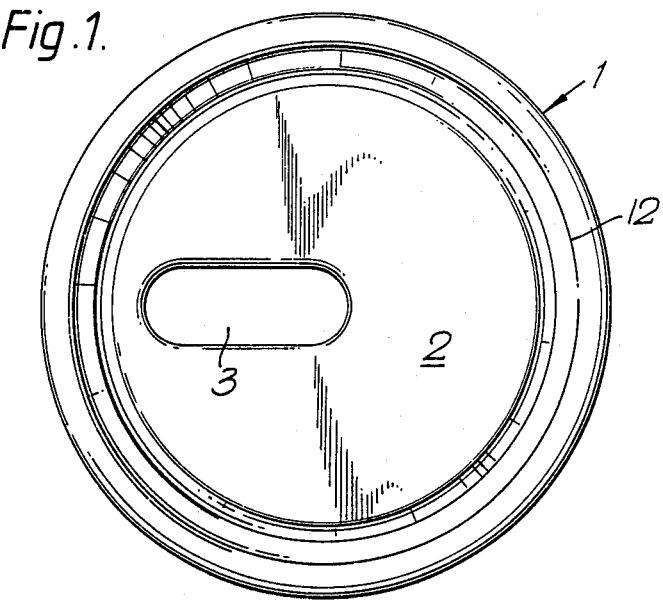
FIGS. 1 and 2 show examples of apertured can ends.
Figure 2:
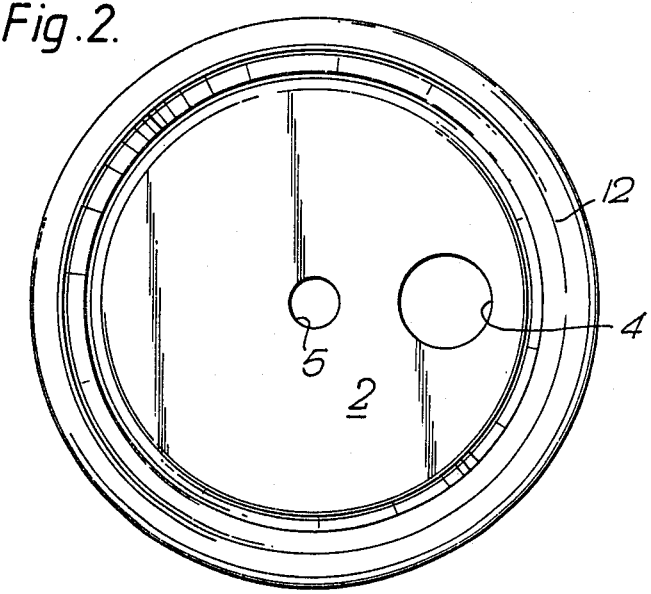

Referring to the drawings, FIG. 1 shows a can end 1 having a substantially flat central portion 2 and an aperture 3 in the shape of a "race-track". FIG. 2 shows a can end having an off-centre aperture 4 and a central aperture 5.

Figure 3:
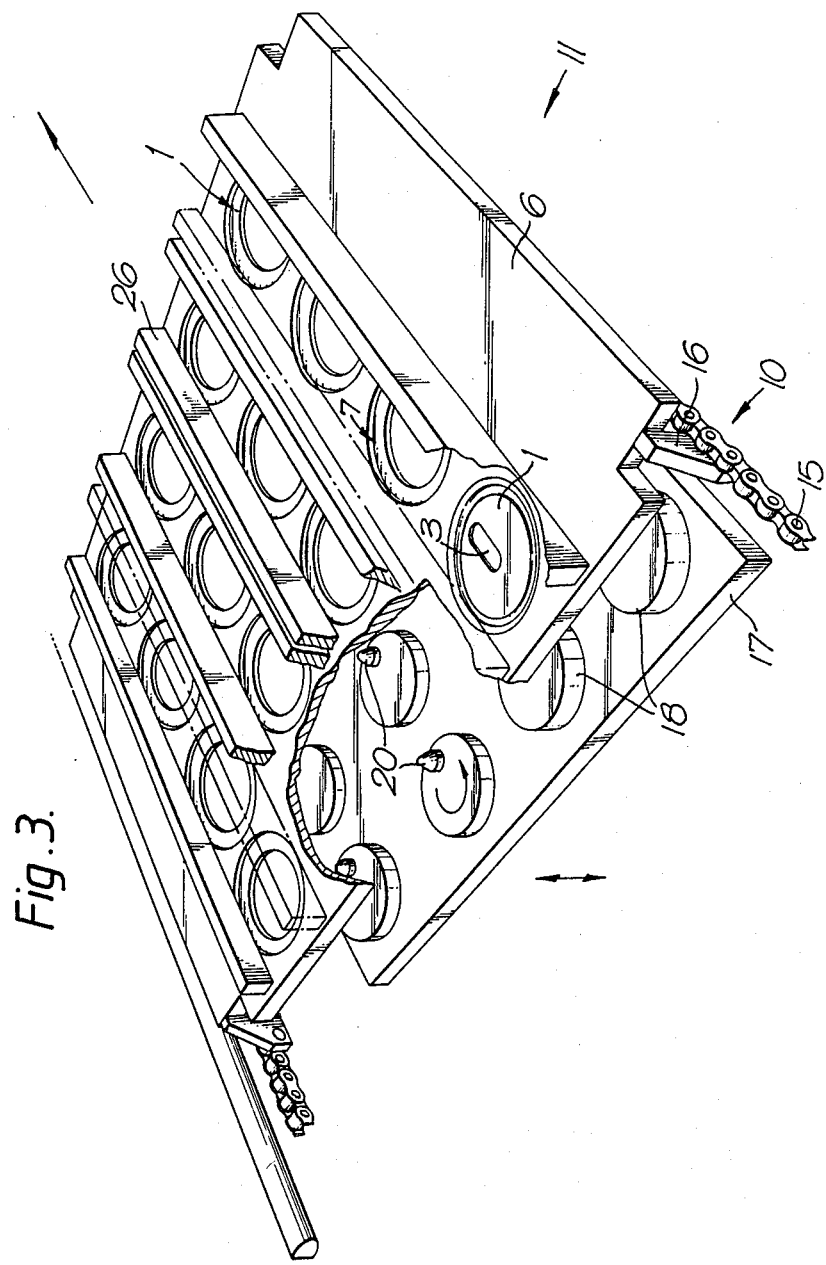
FIG. 3 is a perspective view of apparatus for orientating can ends.
Figure 4:
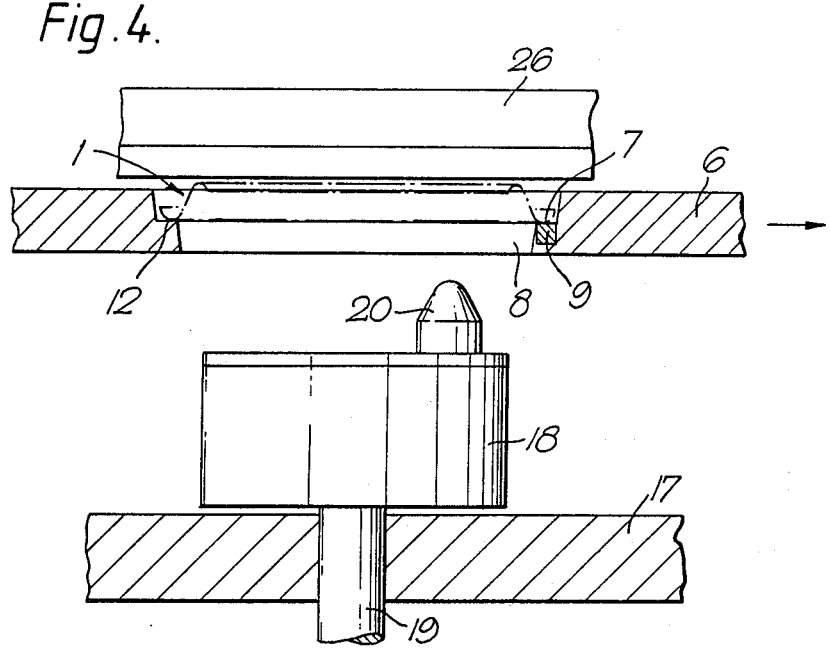
FIG. 4 is a part-sectional view of a part of the orientating apparatus in a retracted non-operational mode.
Figure 5:
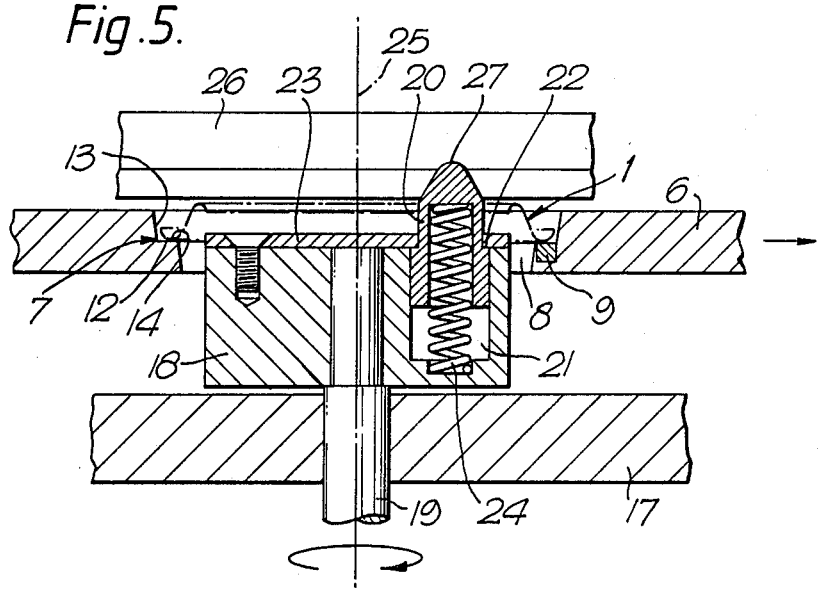
FIG. 5 is a section through a part of the orientating apparatus in an operational mode.

Apparatus for orientating can ends such as those shown in FIGS. 1 and 2 is shown in FIGS. 3-5.

Can ends are delivered from stacks thereof (not shown) to carrier plates 6 which transport the can ends to a moulding machine (not shown). The carrier plates shown each carry sixteen can ends in a 4×4 array. For this purpose the carrier plates are provided with annular seats 7 for the can ends formed around openings 8 through the carrier plates. The seats are defined by a circular surface 13 which provides lateral restraint and an annular surface 14 extending radially inwards from the circular surface to provide axial support for the can ends. Three permanent magnets 9 are spaced around each seat to help locate the can ends and to prevent accidental displacement of the can ends from the seats and premature rotation during orientation. The magnets may be replaced by pads of material having a high coefficient of friction.

The can ends are located with the surface 12 thereof, which will form the outer surface when the can end is fitted to a can, as the undersurface.

The carriers 6 are transported on an indexing conveyor 10 to the orientating station 11 shown in FIG. 3. The conveyor comprises two parallel chains 15 with dogs 16 which engage the trailing edge of the carrier plates, the carriers being supported on guide rails (not shown).

A table 17 mounted beneath the conveyor at the orientating station supports sixteen orientation heads 18. As shown more clearly in FIG. 5, each head is mounted for roation on a shaft 19 and carries an eccentric peg 20 spring mounted in a cylindrical recess 21 in the body of the head. An annular shoulder 22 on the peg cooperates with a top plate 23 on each head to limit the displacement of the peg from its recess.

The arrangement of the heads 18 on the table 17 is such that each shaft 19 thereof is aligned with the central axis 25 of a respective can end and the central axis of each peg lies on a pitch circle which intersects the off-centre aperture in the can end such that the peg may seek, find and enter into the aperture when the necessary rotary alignment has taken place.

Prior to the arrival of a carrier plate 6 at the orientating station, the orientating table is mounted in a lower retracted position (shown in FIG. 4) such that there is no engagement between the heads 18 and the carrier plate. When a carrier plate has been correctly located at the station, the orientating table is moved upwardly to an operating position in which the pegs 20 resiliently engage the undersurfaces 12 of the can ends in the region of their central portions. The strength of the springs 24 is selected so as not to overcome the effect of the magnets 9 and displace the can ends from their seats. Guide rails 26 are, however, mounted over the can ends to restrict any such displacement.

Orientation of the can ends is carried out as follows. Once the table has been raised to its operative position, the tips 27 of the pegs 20 will engage the can ends and will be pushed downwardly into their recesses 21. Each head 18 is then rotated around the pitch circle through precisely one revolution. During this rotation the tip 27 will seek the aperture by wiping the undersurface of the can end until it locates and enters the off-centre aperture 3, thereafter causing the can end to rotate with it until rotation is stopped at the point of desired orientation. After rotation of the heads 18 through one revolution, the table is lowered to its retracted position and the carrier plate is conveyed to the moulding machine.

In one embodiment the carrier plate is adapted to present the can ends in the chosen orientation to injection moulding apparatus which moulds a closure into the apertures.

Although can ends having a race-track aperture 3 are shown in the drawings, it will be understood that all other can ends having off-centre apertures may be orientated in this manner.

The shafts 19 are coupled together and connected to drive means comprising one or more single revolution clutches (not shown), for driving all the heads in rotation simultaneously and accurately through one revolution. Alternative means to achieve a single revolution may be used, however, such as a controlled servo motor or a crank mechanism.

I claim:

1. Apparatus for orientating about their central axes, circular can ends of the kind having an off-centre aperture therein comprising:
    (a) means to deliver each can end to an orienting station;
    (b) resiliently mounted orientating means supported at the orentation station for rotation about a pitch circle intersecting the aperture;
    (c) means for effecting relative motion between the orientating means and a can end at the orientating station to bring the orientating means into engagement with the can end; and
    (d) means for rotating the orientating means about the pitch circle to cause the orientating means to seek and enter the aperture such that continued rotation of the orientating means brings the can end to a chosen orientation at which rotation is stopped.

2. Apparatus according to claim 1 wherein the means to deliver each can end to the orientating station is a carrier plate having at least one seat therein defined by a circular surface which provides lateral restraint for the can end and an annular surface extending radially inwards from the circular surface to provide axial support for the can end.

3. Apparatus according to claim 2 wherein the carrier plate incorporates means to restrain rotation of the can end in the seat while the orientating means seeks the off-centre aperture.

4. Apparatus according to claim 3 wherein the restraining means comprises one or more magnets spaced around the seat.

5. Apparatus according to claim 3 wherein the restraining means comprises one or more pads of material having a high coefficient of friction spaced around the seat.

6. Apparatus according to claim 1 wherein the orientating means is a peg resiliently mounted in an eccentrically located recess formed in the body of an orientating head mounted for intermittent rotation.

7. Apparatus according to claim 1 wherein guide rails are mounted over the can ends at the orientating station to resist the resilient thrust of the orientating means.

8. A method of orientating about their central axes, can ends of the kind having an off-centre aperture therein, the method comprising the steps of:
    (a) delivering the can ends to an orientating station;
    (b) bringing a resiliently supported orientating member into engagement with a can end at the orientating station on a pitch circle which intersects the off-centre aperture;
    (c) rotating the orientating means through at least one revolution around the pitch circle such that the orientating means seeks and enters the eccentric aperture and thereafter causes the can end to rotate with it; and
    (d) stopping the rotation of the orientating means and the can end at a position corresponding to a desired orientation of the can end.

9. A method according to claim 8 wherein can ends are delivered to the orientating station in a carrier plate which transfers the can ends after orientation to an injection moulding machine and which supports the can ends during moulding of closures into the off-centre apertures.

* * * * *